United States Patent
Sugiura et al.

(10) Patent No.: US 9,500,121 B2
(45) Date of Patent: Nov. 22, 2016

(54) TURBOCHARGER

(71) Applicant: IHI Corporation, Koto-ku (JP)

(72) Inventors: Hikaru Sugiura, Tokyo (JP); Hiroaki Minegishi, Tokyo (JP)

(73) Assignee: IHI Corporation, Koto-ku (JP)

( * ) Notice: Subject to any disclaimer, the term of this patent is extended or adjusted under 35 U.S.C. 154(b) by 41 days.

(21) Appl. No.: 14/487,155

(22) Filed: Sep. 16, 2014

(65) Prior Publication Data
US 2015/0000271 A1 Jan. 1, 2015

Related U.S. Application Data

(63) Continuation of application No. PCT/JP2013/060670, filed on Apr. 6, 2013.

(30) Foreign Application Priority Data

Apr. 10, 2012 (JP) ................. 2012-088899

(51) Int. Cl.
*F02D 23/00* (2006.01)
*F02B 37/18* (2006.01)
(Continued)

(52) U.S. Cl.
CPC ........... *F02B 37/186* (2013.01); *F02B 37/002* (2013.01); *F02B 37/02* (2013.01); *F02B 37/025* (2013.01); *F02B 37/22* (2013.01); *Y02T 10/144* (2013.01)

(58) Field of Classification Search
CPC ................ F02B 37/186; F02B 37/18; F02B 37/183; F02B 37/002; F02B 37/02; F02B 37/025; F02B 37/22
(Continued)

(56) References Cited

U.S. PATENT DOCUMENTS

| 7,735,802 | B2 * | 6/2010 | Akabane | F24F 13/1426 251/129.11 |
| 2003/0234378 | A1 * | 12/2003 | Hartley | F16K 1/165 251/307 |
| 2005/0079049 | A1 * | 4/2005 | Ishihara | F02B 37/183 415/182.1 |

FOREIGN PATENT DOCUMENTS

| DE | 102011075450 A1 * | 11/2012 | ........... F01D 17/105 |
| DE | WO 2013003134 A1 * | 1/2013 | ........... F01D 17/105 |

(Continued)

OTHER PUBLICATIONS

International Search Report issued on Jul. 2, 2013 for PCT/JP2013/060670 filed on Apr. 9, 2013 with English Translation.

(Continued)

*Primary Examiner* — Thai Ba Trieu
(74) *Attorney, Agent, or Firm* — Oblon, McClelland, Maier & Neustadt, L.L.P.

(57) ABSTRACT

A turbocharger includes: a turbine housing which houses a turbine impeller; an introduction hole provided in the turbine housing and configured to guide an exhaust gas, which flows into the introduction hole from an exhaust manifold of an engine, to the turbine impeller; a valve provided inside the introduction hole and configured to open and close an exhaust-gas discharge hole in the exhaust manifold; and a restriction portion configured to restrict a turn of the mounting plate in order to make part of an outer peripheral surface of a stem, which is exposed through an exposure hole of the mounting plate, visible from outside of the turbine housing.

17 Claims, 5 Drawing Sheets

(51) Int. Cl.
*F02B 37/22* (2006.01)
*F02B 37/00* (2006.01)
*F02B 37/02* (2006.01)

(58) Field of Classification Search
USPC .......................................................... 60/602
See application file for complete search history.

(56) References Cited

FOREIGN PATENT DOCUMENTS

| | | | |
|---|---|---|---|
| DE | 102012202505 A1 * | 8/2013 | ................ F02C 6/12 |
| DE | 102012217920 A1 * | 4/2014 | ............ F02B 37/183 |
| JP | 62-745 U | 1/1987 | |
| JP | 6-43227 U | 6/1994 | |
| JP | 11-44219 A | 2/1999 | |
| JP | 2002-349275 A | 12/2002 | |
| JP | 2007-120396 A | 5/2007 | |
| JP | 2007-192118 A | 8/2007 | |
| JP | 2010-270715 A | 12/2010 | |
| JP | 2011-98356 A | 5/2011 | |

OTHER PUBLICATIONS

International Written Opinion mailed on Jul. 2, 2013 for PCT/JP2013/060670 filed on Apr. 9, 2013.

\* cited by examiner

TURBOCHARGER

CROSS REFERENCE TO RELATED APPLICATIONS

This application is a continuation application of International Application No. PCT/JP2013/060670, filed on Apr. 9, 2013, which claims priority to Japanese Patent Application No. 2012-088899, filed on Apr. 10, 2012, the entire contents of which are incorporated by references herein.

BACKGROUND OF THE INVENTION

1. Field of the Invention

The present invention relates to a turbocharger having a valve in an inlet of a turbine scroll passage.

2. Description of the Related Art

Turbochargers have been heretofore known in which a turbine shaft with turbine and compressor impellers provided respectively at its two ends is rotatably supported by a bearing housing. A turbocharger of such a type is connected to an engine. An exhaust gas discharged from the engine rotates the turbine impeller, and the rotation of the turbine impeller rotates the compressor impeller via the turbine shaft. Thereby, the turbocharger compresses air as the compressor impeller rotates, and supplies the compressed air to the engine.

Various developments have been carried out for the purpose of enhancing the turbocharging performance of the turbochargers like this. Japanese Patent Application Laid-Open Publication No. 2010-270715 discloses a multi-stage turbocharger in which a low-pressure stage turbocharger and a high-pressure stage turbocharger are provided continuous to each other. Japanese Patent Application Laid-Open Publication No. 2007-192118 discloses a twin scroll-type turbocharger in which two divided turbine scroll passages guide an exhaust gas to a turbine impeller.

When the flow rate of the exhaust gas is low as a result of a low engine speed, the multi-stage turbocharger causes most of the exhaust gas to flow into the low-pressure stage turbocharger after efficiently subjecting the exhaust gas to energy conversion by use of the high-pressure turbocharger with a small capacity. In contrast, when the flow rate of the exhaust gas is high as a result of a high engine speed, the multi-stage turbocharger avoids a rise in the back pressure of the engine by causing most of the exhaust gas to flow directly into the low-pressure stage turbocharger with a large capacity without causing the exhaust gas to pass through the high-pressure stage turbocharger with the small capacity.

The twin scroll-type turbocharger, meanwhile, causes the exhaust gas to flow through one of the two divided turbine scroll passages when the flow rate of the exhaust gas is low as a result of a low engine speed, and causes the exhaust gas to flow through both of the turbine scroll passages when the flow rate of the exhaust gas is high as a result of a high engine speed. Thereby, the response and the rotational torque of the supercharger can be enhanced particularly when the engine speed is low.

For the purpose of switching the passages for the exhaust gas depending on the engine output as described above, each turbocharger includes a valve which is provided in the inlet of each turbine scroll passage. When the valve comes into contact with a corresponding seat surface provided on an exhaust manifold side of the engine, the valve closes a corresponding outlet of the exhaust manifold, and blocks the exhaust gas from flowing into the turbine scroll passage which is provided behind the outlet. Depending on an amount of opening of the valve, the multi-stage turbocharger controls the flow rate of the exhaust gas flowing into the high-pressure stage turbocharger, while the twin scroll-type turbocharger controls the flow rate of the exhaust gas flowing into the one turbine scroll passage and the flow rate of the exhaust gas flowing into the other turbine scroll passage.

SUMMARY OF THE INVENTION

In the case of the turbochargers which as described above, include the valve configured to control the flow rate of the exhaust gas from the exhaust manifold into the turbine scroll passage, an angle at which the valve is attached to the turbocharger needs to be accurate. In this respect, if the valve can be attached to the turbocharger with the valve closed, or with the valve closing the seat surface, it is possible to increase the accuracy of the angle at which the valve is attached to the turbocharger, or the accuracy of the angle at which the valve is positioned to the turbocharger. If, however, the turbocharger uses a configuration in which the opening (peripheral edge) of the exhaust manifold serves as the seat surface, the valve cannot be brought into contact with the seat surface without connecting the exhaust manifold to the turbocharger.

On the other hand, if the exhaust manifold is connected to the turbocharger, the turbocharger becomes hidden behind the exhaust manifold, and the valve cannot be attached. For these reasons, the step of attaching the valve to the turbocharger involves a complicated operation for adjusting the angle.

An object of the present invention is to provide a turbocharger which enables an accurate and easy operation for attaching a valve configured to control a flow rate of an exhaust gas flowing into a turbine impeller.

An aspect of the present invention provides a turbocharger which includes: a turbine housing in which a turbine impeller is housed; an introduction hole provided in the turbine housing, and configured to guide an exhaust gas, which flows into the introduction hole from an exhaust manifold of an engine, to the turbine impeller; a valve provided inside the introduction hole and configured to open and close an exhaust-gas discharge hole in the exhaust manifold, the valve including a stem turnably supported by the turbine housing, a mounting plate having an insertion hole in which the stem is inserted, and an exposure hole which communicates with the insertion hole and is configured to expose part of an outer peripheral surface of the stem, the mounting plate being welded to the stem in the exposure hole, and a valve body supported by the mounting plate and configured to open and close the discharge hole; and a restriction portion configured to restrict a turn of the mounting plate in order to make the part of the outer peripheral surface of the stem, which is exposed through the exposure hole, visible from outside of the turbine housing.

The restriction portion may be provided so as to restrict the turn of the mounting plate outside a range of a fully-closed to fully-opened positions of the valve, the range being a range of rotational angles of the mounting plate around a rotational axis of the stem.

When observed from the same viewpoint, an area of the outer peripheral surface of the stem visible from the outside of the turbine housing in the state where the turn of the mounting plate is restricted by the restriction portion may be larger than an area of the outer peripheral surface of the stem visible from the outside of the turbine housing when the valve is located at a fully closed position.

The restriction portion may be formed from a projecting portion provided to the mounting plate, and the projecting portion may restrict the turn of the mounting plate by coming into contact with the turbine housing.

The restriction portion may be formed from a jutting portion provided to the turbine housing, and the jutting portion may restrict the turn of the mounting plate by coming into contact with the mounting plate.

The restriction portion may be formed from a projecting portion provided to the mounting plate, and a jutting portion provided to the turbine housing, and the projecting portion and the jutting portion may come into contact with each other and thereby restrict the turn of the mounting plate.

The present invention enables an accurate and easy operation for attaching a valve configured to control a flow rate of an exhaust gas flowing into a turbine impeller.

DESCRIPTION OF THE PREFERRED EMBODIMENTS

Referring to the accompanying drawings, detailed descriptions will be provided for a preferred embodiment of the present invention. Dimensions, materials, concrete numerical values and the like in the embodiment are shown just as examples for the purpose of making the present invention easy to understand. None of them limit the present invention unless specifically stated otherwise. It should be noted that: throughout the specification and the drawings, elements having virtually the same functions and configurations will be denoted by the same reference signs; thereby, duplicated descriptions will be omitted; and elements having nothing direct to do with the present invention will be omitted from the illustrations.

Figure 1:
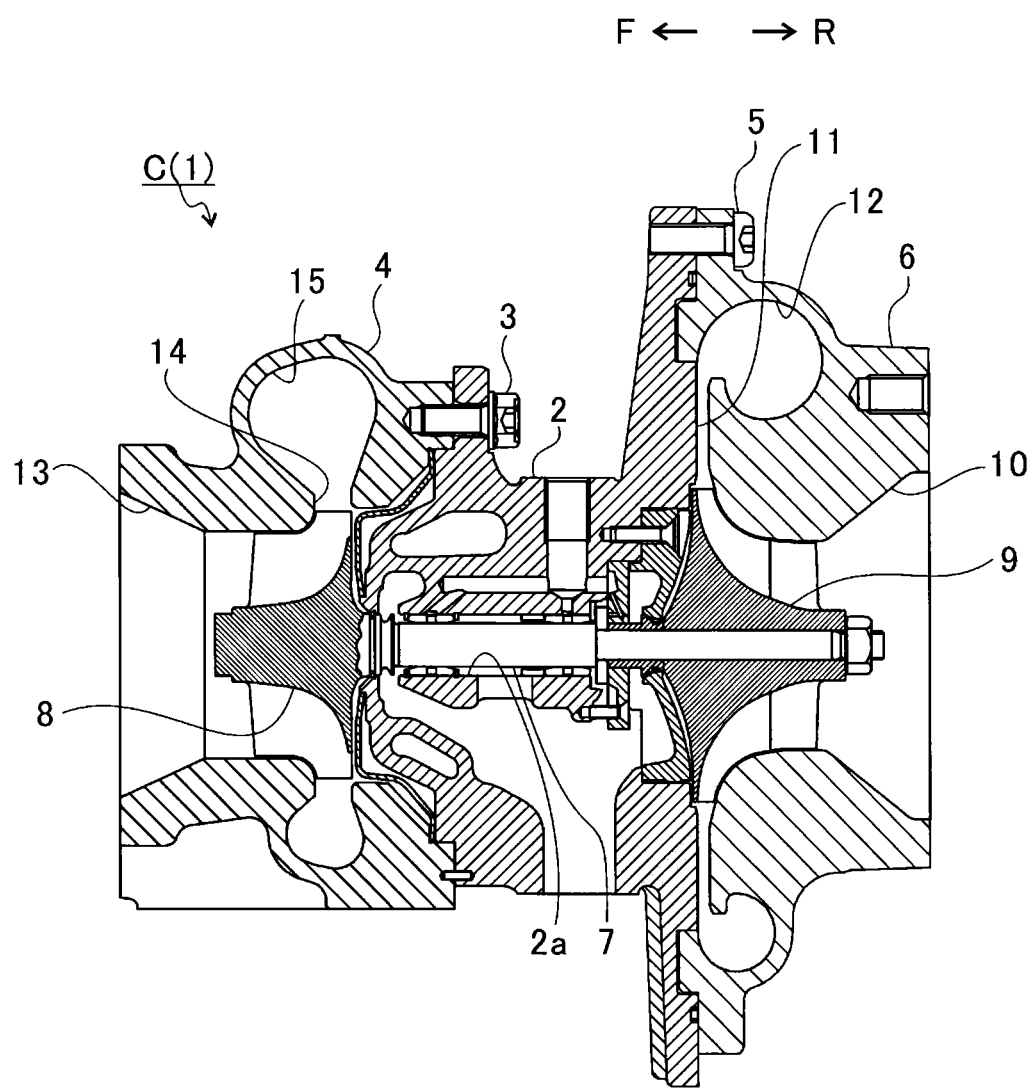
FIG. 1 is a schematic cross-sectional view of a turbocharger.

FIG. 1 is a schematic cross-sectional view of a turbocharger C. The following descriptions will be given with a direction of an arrow F in FIG. 1 pointing to a front side of the turbocharger C, and with a direction of an arrow R in FIG. 1 pointing to a rear side of the turbocharger C. As shown in FIG. 1, the turbocharger C includes a turbocharger body 1. The turbocharger body 1 is integrally formed from: a bearing housing 2; a turbine housing 4 connected to a front side of the bearing housing 2 by use of a fastening bolt 3; and a compressor housing 6 connected to a rear side of the bearing housing 2 by use of a fastening bolt 5.

A bearing hole 2a penetrating through the bearing housing 2 in a front-rear direction of the turbocharger C is formed in the bearing housing 2. A turbine shaft 7 is rotatably supported by the bearing hole 2a with bearings interposed in between. A turbine impeller 8 is integrally fixed to a front end portion (one end) of the turbine shaft 7. The turbine impeller 8 is rotatably housed inside the turbine housing 4. In addition, a compressor impeller 9 is integrally fixed to a rear end portion (an opposite end) of the turbine shaft 7. The compressor impeller 9 is rotatably housed inside the compressor housing 6.

An intake port 10 is formed in the compressor housing 6. The intake port 10 is opened toward the rear of the turbocharger C, and is connected to an air cleaner, albeit not illustrated. Moreover, while the bearing housing 2 and the compressor housing 6 are connected together by use of the fastening bolt 5, opposing surfaces of the two housings 2, 6 form a diffuser passage 11 configured to boost the pressure of air by compressing the air. The diffuser passage 11 is shaped like a ring around a center axis of the turbine shaft 7 (the compressor impeller 9) in a way that the diffuser passage 11 extends from its inside to outside in radial directions of the turbine shaft 7 (the compressor impeller 9). Furthermore, an inner side of the diffuser passage 11 in the radial directions of the turbine shaft 7 communicates with the intake port 10 via a space for housing the compressor impeller 9.

The compressor housing 6 is provided with a compressor scroll passage 12. The compressor scroll passage 12 is shaped like a ring around the center axis of the turbine shaft 7 (the compressor impeller 9), and is placed outside the diffuser passage 11 in the radial directions of the turbine shaft 7 (the compressor impeller 9). The compressor scroll passage 12 communicates with an intake port of an engine, albeit not illustrated, and with the diffuser passage 11 as well. For this reason, once the compressor impeller 9 rotates, a fluid is taken into the compressor housing 6 through the intake port 10. Thereafter, the fluid thus taken in is guided to the intake port of the engine while the pressure of the fluid is boosted in the diffuser passage 11 and the compressor scroll passage 12.

A discharge port 13 is formed in the turbine housing 4. The discharge port 13 is opened toward the front of the turbocharger C, and is connected to an exhaust emission control system, albeit not illustrated. The turbine housing 4 is provided with a passage 14; and an annular turbine scroll passage 15 placed outside the passage 14 in the radial directions of the turbine shaft 7 (the turbine impeller 8). The turbine scroll passage 15 communicates with a gas inlet, albeit not illustrated, to which an exhaust gas discharged from an exhaust manifold of the engine, albeit not illustrated, is guided, and with the passage 14 as well. For this reason, the exhaust gas guided into the turbine scroll passage 15 through the gas inlet is guided to the discharge port 13 via the passage 14 and the turbine impeller 8, and rotates the turbine impeller 8 while flowing there. Torque of the turbine impeller 8 is transmitted to the compressor impeller 9 via the turbine shaft 7. Torque of the compressor impeller 9 guides the fluid to the intake port of the engine while the pressure of the fluid is boosted as described above.

The turbocharger C of the embodiment constitutes a low-pressure stage turbocharger in a series arrangement-type multi-stage turbocharger. The turbocharger C includes a valve which is provided in an inlet of the turbine scroll passage 15. This valve controls the flow rate of the exhaust gas flowing into the low-pressure stage turbocharger, and the flow rate of the exhaust gas flowing into the high-pressure stage turbocharger. Detailed descriptions will be hereinbelow provided for the valve and a structure in the vicinity of the valve.

Figure 2A:
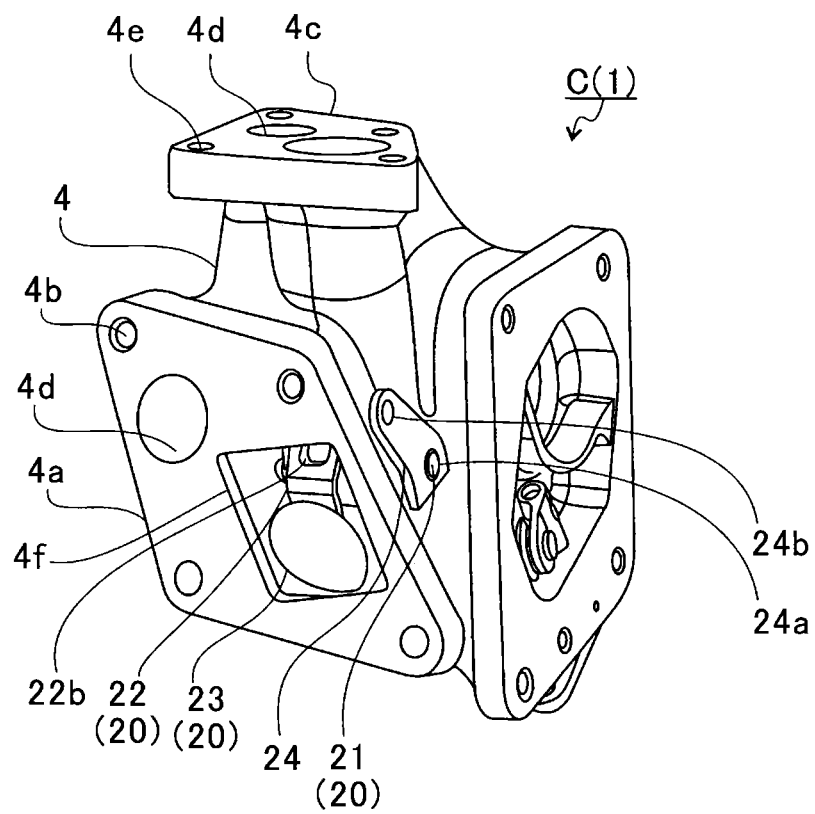
FIGS. 2A and 2B are explanatory views for explaining a valve which is disposed in an inlet of a turbine scroll passage, and which is fully opened.
Figure 2B:
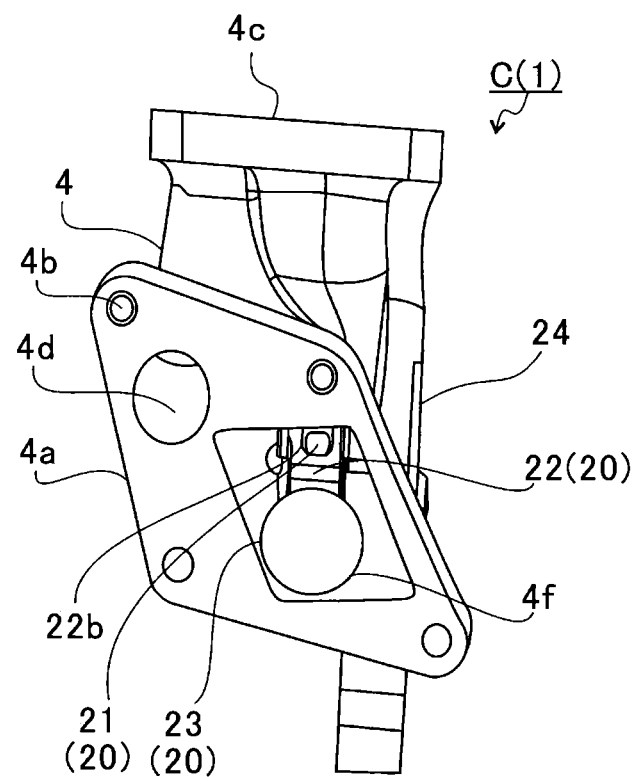

FIGS. 2A and 2B are explanatory views for explaining a fully opened valve 20 disposed in the inlet of the turbine scroll passage 15, and how the valve 20 is fully opened. FIG.

2A shows a perspective view of the turbocharger C, and FIG. 2B shows a side view of the turbocharger C. Incidentally, FIGS. 2A and 2B extract and show the turbine housing 4 only for the purpose of facilitating the understanding, and omit illustration of the bearing housing 2 and the compressor housing 6.

As shown in FIGS. 2A and 2B, a flange surface 4a is provided on a side surface of the turbine housing 4. The flange surface 4a is configured to be capable of coming into surface contact with a flange surface which is provided to the exhaust manifold of the engine when the turbocharger C and the engine are connected together. With the two surfaces brought into surface contact with each other, the turbine housing 4 and the exhaust manifold are fastened together with bolts through bolt holes 4b.

The flange surface 4a is provided with a through-hole 4d penetrating to another flange surface 4c of the turbine housing 4. The flange surface 4c is configured to be capable of coming into surface contact with a flange surface which is provided to a turbine housing in the high-pressure stage turbocharger, albeit not illustrated, when the turbocharger C and the high-pressure stage turbocharger are connected together. With the two surfaces brought into surface contact with each other, the turbine housing of the turbocharger C and the turbine housing of the high-pressure stage turbocharger are fastened together with bolts through bolt holes 4e.

The flange surface 4a is further provided with an introduction hole 4f communicating with the turbine scroll passage 15. When the turbocharger C and the exhaust manifold are connected together, the through-hole 4d and the introduction hole 4f communicate respectively with two discharge holes, albeit not illustrated, in the exhaust manifold. For this reason, the exhaust gas discharged from one of the discharge holes in the exhaust manifold is guided via the through-hole 4d to the turbine scroll passage in the high-pressure stage turbocharger connected to the flange surface 4c, while the exhaust gas discharged from the other discharge hole is guided via the introduction hole 4f to the turbine scroll passage 15 in the turbocharger C.

Furthermore, the valve 20 configured to open and close one of the discharge holes in the exhaust manifold is provided inside the introduction hole 4f. The valve 20 includes a stem 21, a mounting plate 22, and a valve body 23.

Figure 3:
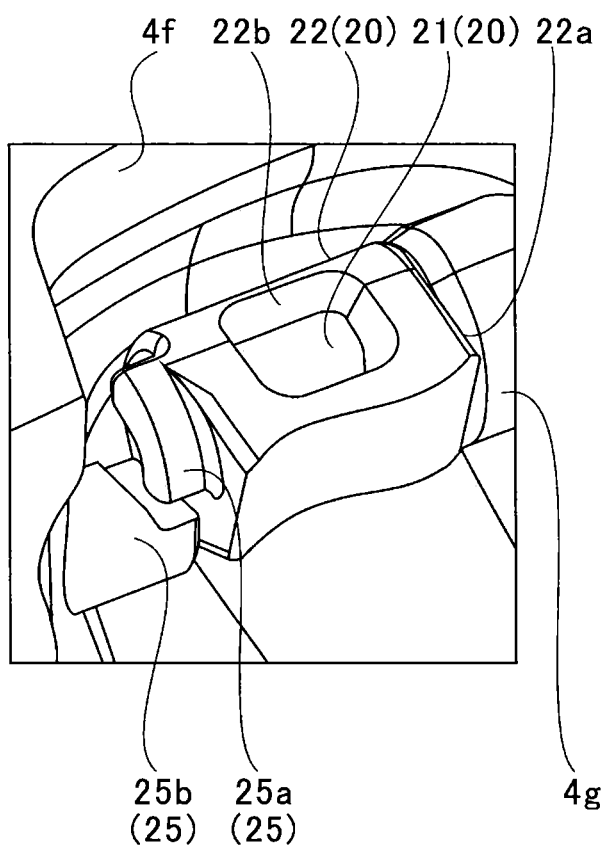
FIG. 3 is a partial magnified view of a stem of a mounting plate inside an introduction hole and the vicinity of the stem.

FIG. 3 is a partial magnified view of the stem 21 inside the introduction hole 4f and the vicinity of the stem 21. Incidentally, FIG. 3 extracts and shows an exposure hole 22b in the mounting plate 22 and the vicinity of the exposure hole 22b only for the purpose of facilitating the understanding.

The stem 21 is a rod (a bar-shaped body) configured to bring the mounting plate 22 and the valve body 23 closer to, or away from, the discharge hole in the exhaust manifold in response to the turn of a link plate (which will be described later) 24. As shown in FIG. 3, the stem 21 is turnably supported by the turbine housing 4 with the assistance of a bearing 4g. The mounting plate 22 is a plate-shaped member, and includes: an insertion hole 22a in which to insert the stem 21; and the exposure hole 22b communicating with the insertion hole 22a, and exposing part of the outer peripheral surface of the stem 21. Furthermore, as shown in FIG. 2A, the valve body 23 is supported by the mounting plate 22, and opens and closes the discharge hole in the exhaust manifold. Incidentally, of the mounting plate 22, a portion for supporting the valve 23 may be bent, in an opening direction of the discharge hole in the exhaust manifold, from another portion connected to the stem 21, as shown in FIG. 2A.

The mounting plate 22 and the valve body 23 are fixed together by welding, for example. Furthermore, while inserted in the insertion hole 22a in the mounting plate 22, the stem 21 is welded by bringing a torch or the like close to the exposure hole 22b. Thereby, the valve body 23 rotates integrally with the stem 21 with the assistance of the mounting plate 22.

As shown in FIGS. 2A and 2B, one end of the stem 21 is fixed to the link plate 24 while inserted in a fixing hole 24a in the link plate 24. An interlock member, albeit not illustrated, fixed to a rod of an actuator and configured to move with the rod, is turnably inserted in a continuous installation hole 24b in the link plate 24.

The actuator drives the link plate 24 by use of the rod. Thereby, the link plate 24 turns the stem 21 around its rotational center. In response to the turn, the stem 21 turns. In response to the turn of the stem 21, the mounting plate 22 opens and closes the valve body 23.

The multi-stage turbocharger causes most of the exhaust gas to flow into the low-pressure stage turbocharger after efficiently subjecting the exhaust gas to energy conversion by use of the high-pressure turbocharger with a small capacity, when the flow rate of the exhaust gas is low as a result of a low engine speed. On the other hand, when the flow rate of the exhaust gas is high as a result of a high engine speed, the multi-stage turbocharger avoids a rise in the back pressure of the engine by causing most of the exhaust gas to flow directly into the low-pressure stage turbocharger with a large capacity without causing the exhaust gas to pass through the high-pressure stage turbocharger with the small capacity.

When the valve body 23 comes into contact with a seat surface of the discharge hole provided on the exhaust manifold side of the engine, the valve 20 closes the outlet of the discharge hole, and thereby blocks the exhaust gas from flowing into the turbine scroll passage 15. By this, all of the exhaust gas discharged from the engine is guided from the exhaust manifold to the high-pressure stage turbocharger via the through-hole 4d in the turbocharger C. In this manner, the flow rate of the exhaust gas flowing into the turbocharger C and the flow rate of the exhaust gas flowing into the high-pressure stage turbocharger are controlled by adjusting the opening of the valve 20.

Next, detailed descriptions will be provided for a step of attaching the valve 20. First of all, with the mounting plate 22 placed inside the introduction hole 4f, the stem 21 is inserted into the insertion hole 22a in the mounting plate 22, and into the bearing 4g. Subsequently, an end portion of the stem 21, which projects to the outside of the turbine housing 4, is inserted into the fixing hole 24a in the link plate 24. Thereafter, the link plate 24 is welded to the stem 21 while restricting the rotational position of the link plate 24 around the stem 21 by use of a jig or the like. After that, the mounting plate 22 is welded to the stem 21 in the exposure hole 22b. Descriptions will be hereinbelow provided for a position at which the valve 20 should be placed for the purpose of facilitating the welding process.

In FIGS. 2A and 2B, the valve 20 is fully opened, and the valve body 23 is located at a position at which the valve body 23 leaves the discharge hole in the exhaust manifold unclosed even when the turbocharger C and the engine are connected together.

Figure 4A:
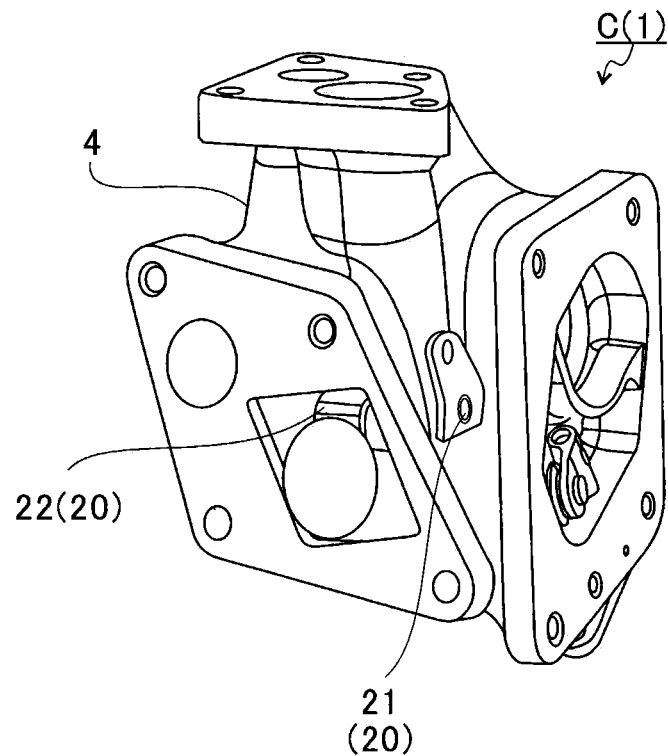
FIGS. 4A and 4B are explanatory views for explaining the valve which is disposed in the inlet of the turbine scroll passage, and which is fully closed.
Figure 4B:
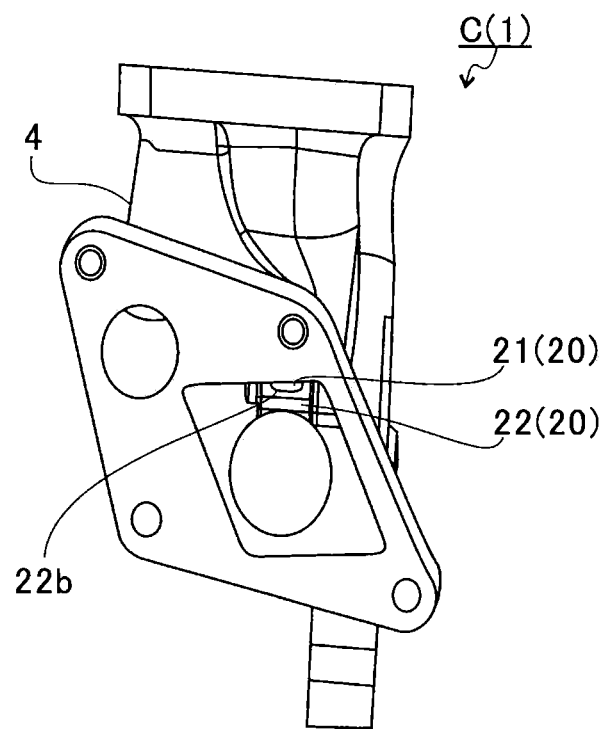

FIGS. 4A and 4B are explanatory views for explaining the valve 20 which is disposed in the inlet of the turbine scroll passage 15, and which is fully closed. When the valve is located in a fully-closed position, part of the exposure hole 22b is hidden behind the turbine housing 4 as shown in FIGS. 4A and 4B. For this reason, when the stem 21 and the mounting plate 22 are welded together, the torch cannot be brought close to the exposure hole 22b, and it is difficult to perform the welding. Even when the valve 20 is in a fully-opened position, a space between the exposure hole 22b and the turbine housing 4 is narrow as shown in FIGS. 2A and 2B. For this reason, it is difficult to perform the welding.

Figure 5A:
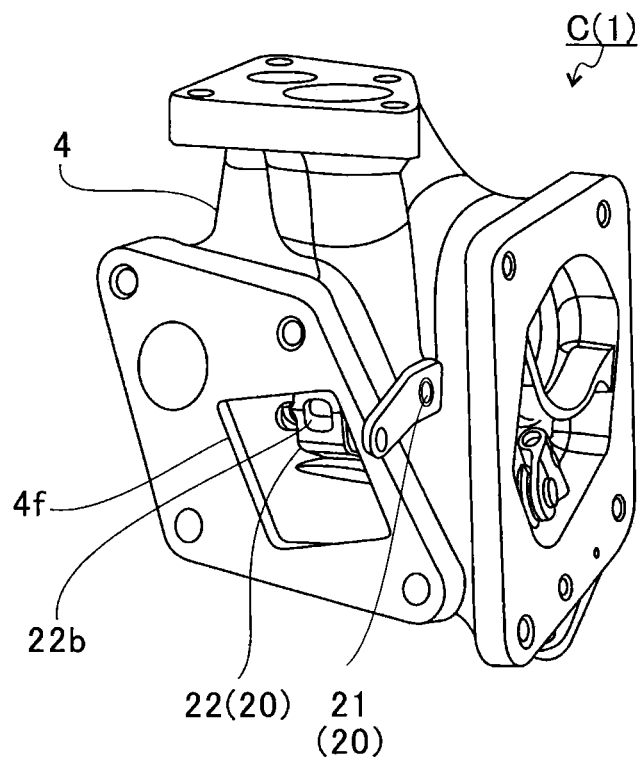
FIGS. 5A and 5B are explanatory views for explaining the valve which is disposed in the inlet of the turbine scroll passage, and which turns beyond a range of rotational angles of the stem while in operation.
Figure 5B:
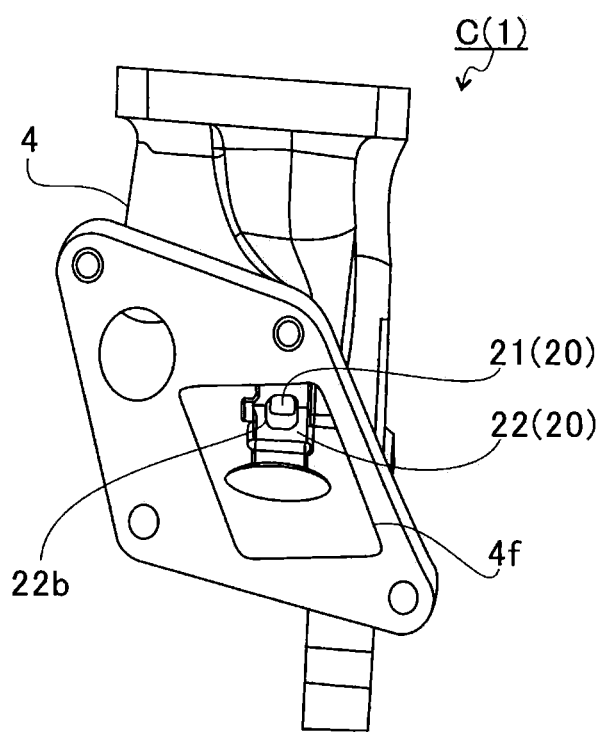

FIGS. 5A and 5B are explanatory views for explaining the valve 20 which is disposed in the inlet of the turbine scroll passage 15, and which turns beyond a range of rotational angles of the stem 21 while in operation. These drawings show the turbocharger C in a state where the valve 20 turns beyond the range of rotational angles of the stem 21 (the mounting plate 22) while in operation.

As shown in FIGS. 5A and 5B, when the valve 20 is located deeper inside the introduction hole 4f than the position when the valve 20 is fully opened, the exposure hole 22b in the mounting plate 22 is not hidden behind the turbine housing 4, and is located at position which is accessible from the outside of the turbine housing 4. As a result, it is easy to perform the operation to weld the stem 21 and the mounting plate 22 together. In other words, when the valve 20 is turned beyond the range of rotational angles of the mounting plate 22 around the rotational axis of the stem 21 (hereinafter referred to as a range of rotational angles for operation), which extends from the fully-closed position to the fully-opened position, the stem 21 and the mounting plate 22 are easily welded together. Incidentally, an angle within the range of rotational angles for operation restricts the opening of the valve 20.

In the embodiment, the turbocharger C is provided with a restriction portion 25. The restriction portion 25 restricts the turn of the mounting plate 22, and holds the mounting plate 22 at an angle (hereinafter referred to as a holding angle) which facilitates the welding work. The holding angle is set outside the range of rotational angles for operation, and at a value which ensures that the valve body 23 closes the discharge hole (in other words, the valve body 23 comes into contact with the seat surface) when the link plate 24 turns to the position at which the valve 20 is fully closed.

As shown in FIG. 3, the restriction portion 25 is formed from: a projecting portion 25a provided to the mounting plate 22; and a jutting portion 25b provided to the turbine housing 4. The projecting portion 25a is provided to a portion of the mounting plate 22 in which the insertion hole 22a and the exposure hole 22b are formed. The projecting portion 25a is formed integrally with the mounting plate 22 by precision casting, sintering, metal-powder injection molding, or the like. To put it concretely, the projecting portion 25a is provided integrally to the edge of the opening portion of the insertion hole 22a, and is formed in a way that the projecting portion 25a juts into the inner wall of the introduction hole 4f. Meanwhile, as shown in FIG. 3, the projecting portion 25a may be formed along the edge of the opening portion, and in the shape of an arc which is concentric with the insertion hole 22a. In this case, the distance between the projecting portion 25a and the inner wall of the introduction hole 4f is constant despite the rotational angle of the mounting plate 22. For this reason, interference between the projecting portion 25a and the inner wall of the introduction hole 4f can be avoided to the utmost. On the other hand, the jutting portion 25b is formed jutting from the inner wall of the introduction hole 4f into the mounting plate 22. The jutting portion 25b has a portion (a stage, a contact surface) which comes into contact with part of the projecting portion 25a when the mounting plate 22 turns to the holding angle. In other words, the contact of the projecting portion 25a with the jutting portion 25b restricts the turn of the mounting plate 22 outside the range of rotational angles for operation. For example, when the mounting plate 22 reaches a position shown in FIG. 5, the projecting portion 25a and the jutting portion 25b come into contact with each other as shown in FIG. 3. In this state, the mounting plate 22 is restricted from turning beyond the holding angle toward the inside of the introduction hole 4f. Incidentally, the contact surfaces of the respective projecting portion 25a and the jutting portion 25b may be formed in a flat shape, for example, by machining in order that the contact surfaces thereof can come into surface contact with each other. In this case, the mounting plate 22 can be positioned stably. Furthermore, the contact surface of the projecting portion 25a may be in parallel with the flange surface 4a. In this case, the projecting portion 25a can be machined easily, and post-process inspections (for example, quality inspections in terms of gradient and the like) can be easily performed on the contact surface of the projecting portion 25a.

In the state where the restriction portion 25 restricts the turn of the mounting plate 22, or in the state where the restriction portion 25 positions the mounting plate 22, the exposure hole 22b is held at the place which is accessible from the outside. For this reason, the stem 21 and the mounting plate 22 can be easily welded together. Furthermore, since the welding of the mounting plate 22 and the stem 21 is performed at the position at which the valve 20 is opened, the space between the valve body 23 and the inner wall of the introduction hole 4f is expanded. For this reason, it is easy to avoid the interference of the valve body 23 with the torch of a welder, and accordingly to perform the welding work.

As described above, the turbocharger C of the embodiment includes the restriction portion 25. The restriction portion 25 accordingly enables the valve 20 to be positioned securely and easily when the valve 20 is welded, even though the seat surface cannot be used to position the valve 20 for its fully-opened position in the welding work. In addition, positional precision is improved when the welded valve 20 is opened and closed. Moreover, since the exposure hole 22b is not hidden behind the turbine housing 4 and sufficient work space can be secured during the welding work, the workability is enhanced.

The exposure hole 22b is placed in a way that the outer peripheral surface of the stem 21 is visible through the exposure hole 22b from the outside of the turbine housing 4. When observed from the same viewpoint, the area of the outer peripheral surface of the stem 21 visible from the outside of the turbine housing 4 in the state where the turn of the mounting plate 22 is restricted by the restriction portion 25 is larger the area of the outer peripheral surface of the step 21 visible from the outside of the turbine housing when the valve 20 is located at the fully closed position.

For this reason, the turbocharger C of the embodiment enhances the visibility of the welded portion and the workability in the welding in the state where the turn of the mounting plate 22 is restricted by the restriction portion 25, or in the state where the mounting plate 22 is positioned by the restriction portion 25.

The foregoing embodiment has explained the case where the stem 21 and the mounting plate 22 are welded together after the stem 21 and the link plate 24 are welded together. Instead, however, the stem 21 and the link plate 24 may be welded together after the stem 21 and the mounting plate 22 are welded together. Even in the latter case, the positional precision is improved when the welded valve 20 is opened and closed, by: welding the stem 21 and the mounting plate 22 with the mounting plate 22 positioned by the restriction portion 25; and thereafter welding the link plate 24, whose rotational position is restricted by a jig, to the stem 21.

Furthermore, in the foregoing embodiment, the restriction portion 25 is formed from the projecting portion 25a and the jutting portion 25b. Instead, the restriction portion 25 may be formed solely from the projecting portion 25a provided to the mounting plate 22. In this case, the projecting portion 25a is formed in a way that its contact with the turbine housing 4 restricts the turn of the mounting plate 22. Otherwise, the restriction portion 25 may be formed solely from the jutting portion 25b provided to the turbine housing 4. In this case, the jutting portion 25b is formed in a way that its contact with the mounting plate 22 restricts the turn of the mounting plate 22.

Even in the case where the restriction portion is formed solely from the projecting portion 25a or solely from the jutting portion 25b, the restriction portion can perform the positioning in the welding process for the valve 20. Accordingly, the precision and workability can be enhanced in the welding process.

Moreover, the position of the placement of the restriction portion 25 is not limited to the position shown in FIG. 3. For example, the restriction portion 25 may be provided in a way that the holding angle of the mounting plate 22 is confined to the range of rotational angles for operation. In this case, at least the jutting portion 25b is detachably placed on the inner wall of the introduction hole 4f, and is removed from the inner wall of the introduction hole 4f in order to avoid the interference of the jutting portion 25b with the turn of the mounting plate 22 after the stem 21 and the mounting plate 22 are welded together.

Furthermore, the foregoing embodiment has explained the case where: the turbocharger C constitutes the low-pressure stage turbocharger in the multi-stage turbocharger; and the valve 20, the object of the welding process using the restriction portion 25, is the valve configured to control the flow rate of the exhaust gas flowing into the low-pressure stage turbocharger, and the flow rate of the exhaust gas flowing into the high-pressure stage turbocharger. Instead, however, the turbocharger C may be a twin scroll-type turbocharger in which its valve, the object of the welding process using the restriction portion 25, is a valve configured to control the flow rate of the exhaust gas flowing into one turbine scroll passage, and the flow rate of the exhaust gas flowing into the other turbine scroll passage.

In addition, the foregoing embodiment has explained the case where the turbocharger C constitutes the low-pressure stage turbocharger in the series arrangement-type multi-stage turbocharger including the low-pressure stage turbocharger and the high-pressure stage turbocharger which are connected to the exhaust manifold of the engine in series. Instead, however, the turbocharger C may be used as turbochargers which constitute a parallel arrangement-type multi-stage turbocharger. The parallel arrangement-type multi-stage turbocharger includes multiple turbochargers which are connected to the exhaust manifold of the engine in parallel. No matter which type the turbocharger is, the above-described configuration including the restriction portion 25 enhances the workability in the welding process even in a case where the turbine housing 4 is provided with no seat surface with which the valve body of the valve comes into contact.

Referring to the accompanying drawings, the foregoing descriptions have been provided for the preferable embodiments. However, it goes without saying that the present invention is not limited to these embodiments. It is clear that those skilled in the art can arrive at various modifications or corrections within the category described in the scope of claims. It shall be understood that all such modifications and corrections belong to the technical scope of the present invention.

What is claimed is:

1. A turbocharger comprising:
a turbine housing in which a turbine impeller is housed;
an introduction hole provided in the turbine housing;
a valve provided inside the introduction hole and contacting a sheet surface of an exhaust-gas discharge hole in an exhaust manifold, the valve further including:
a stem supported by the turbine housing, and a mounting plate having an insertion hole in which the stem is inserted, and an exposure hole which communicates with the insertion hole and is configured to expose part of an outer peripheral surface of the stem, the mounting plate being welded to the stem in the exposure hole; and
a restriction portion, being a form of at least one of a protecting portion on the mounting plate and a juttinq portion on the turbine housing, which restricts a rotational motion of the mounting plate by contacting the turbine housing or mounting plate at an angle where a part of the outer peripheral surface of the stem is visible from an outside of the turbine housing through the exposure hole.

2. The turbocharger according to claim 1, wherein the restriction portion is provided so as to restrict the rotational motion of the mounting plate outside a range of fully-dosed to fully-opened positions of the valve while being in operation, the range being a range of rotational angles of the mounting plate around a rotational axis of the stem.

3. The turbocharger according to claim 2, wherein an area of the outer peripheral surface of the stem visible from the outside of the turbine housing where the rotational motion of the mounting plate is restricted by the restriction portion is larger than an area of the outer peripheral surface of the stem visible from the outside of the turbine housing when the valve is located at a fully-closed position while being in operation.

4. The turbocharger according to claim 3, wherein
the restriction portion is in the form of the projecting portion provided to the mounting plate; and
the projecting portion restricts the rotational motion of the mounting plate by contacting with the turbine housing.

5. The turbocharger according to claim 3, wherein
the restriction portion is in the form of the jutting portion provided to the turbine housing; and
the jutting portion restricts the rotational motion of the mounting plate by contacting with the mounting plate.

6. The turbocharger according to claim 3, wherein
the restriction portion is in the form of the projecting portion provided to the mounting plate, and the jutting portion provided to the turbine housing; and
the projecting portion and the jutting portion contact to each other and thereby restrict the rotational motion of the mounting plate.

7. The turbocharger according to claim 2, wherein
the restriction portion is in the form of the projecting portion provided to the mounting plate; and
the projecting portion restricts the rotational motion of the mounting plate by contacting with the turbine housing.

8. The turbocharger according to claim 2, wherein
the restriction portion is in the form of the jutting portion provided to the turbine housing; and
the jutting portion restricts the rotational motion of the mounting plate by contacting with the mounting plate.

9. The turbocharger according to claim 2, wherein
the restriction portion is in the form of the projecting portion provided to the mounting plate, and the jutting portion provided to the turbine housing; and
the projecting portion and the jutting portion contact to each other and thereby restrict the rotational motion of the mounting plate.

10. The turbocharger according to claim 1, wherein an area of the outer peripheral surface of the stem visible from the outside of the turbine housing where the rotational motion of the mounting plate is restricted by the restriction portion is larger than an area of the outer peripheral surface of the stem visible from the outside of the turbine housing when the valve is located at a fully-closed position while being in operation.

11. The turbocharger according to claim 10, wherein
the restriction portion is in the form of the projecting portion provided to the mounting plate; and
the projecting portion restricts the rotational motion of the mounting plate by contacting with the turbine housing.

12. The turbocharger according to claim 10, wherein
the restriction portion is in the form of the jutting portion provided to the turbine housing; and
the jutting portion restricts the rotational motion of the mounting plate by contacting with the mounting plate.

13. The turbocharger according to claim 10, wherein
the restriction portion is in the form of the projecting portion provided to the mounting plate, and the jutting portion provided to the turbine housing; and
the projecting portion and the jutting portion contact to each other and thereby restrict the rotational motion of the mounting plate.

14. The turbocharger according to claim 1, wherein
the restriction portion is in the form of the projecting portion provided to the mounting plate; and
the projecting portion restricts the rotational motion of the mounting plate by contacting with the turbine housing.

15. The turbocharger according to claim 1, wherein
the restriction portion is in the form of the jutting portion provided to the turbine housing; and
the jutting portion restricts the rotational motion of the mounting plate by contacting with the mounting plate.

16. The turbocharger according to claim 1, wherein
the restriction portion is in the form of the projecting portion provided to the mounting plate, and the jutting portion provided to the turbine housing; and
the projecting portion and the jutting portion contact to each other and thereby restrict the rotational motion of the mounting plate.

17. A turbocharger comprising:
a turbine housing configured to include an introduction hole to be coupled to a discharge hole provided in an exhaust manifold, the discharge hole including a sheet surface;
a valve body provided in the turbine housing to contact the sheet surface therein through the introduction hole;
a mounting plate configured to support the valve body, the mounting plate including an exposure hole;
a stem coupled to the mounting plate, a part of an outer peripheral surface of the stem being exposed through the exposure hole; and
a restriction potion, being a form of at least one of a projecting portion on the mounting plate and a jutting portion on the turbine housing, contacting the turbine housing or the mounting plate at an angle where the exposure hole is exposed through the introduction hole to restrict a rotational motion of the mounting plate.

* * * * *

UNITED STATES PATENT AND TRADEMARK OFFICE
CERTIFICATE OF CORRECTION

PATENT NO. : 9,500,121 B2
APPLICATION NO. : 14/487155
DATED : November 22, 2016
INVENTOR(S) : Hikaru Sugiura et al.

It is certified that error appears in the above-identified patent and that said Letters Patent is hereby corrected as shown below:

On the Title Page

Item (63), the Related U.S. Application Data information is incorrect. Item (63) should read:
--Related U.S. Application Data
(63) Continuation of Application No. PCT/JP2013/060670, filed on Apr. 9, 2013--

Signed and Sealed this
First Day of May, 2018

Andrei Iancu
*Director of the United States Patent and Trademark Office*